US006408301B1

(12) United States Patent
Patton et al.

(10) Patent No.: US 6,408,301 B1
(45) Date of Patent: Jun. 18, 2002

(54) INTERACTIVE IMAGE STORAGE, INDEXING AND RETRIEVAL SYSTEM

(75) Inventors: David L. Patton, Webster; Philip R. Ashe; Joseph A. Manico, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/256,652

(22) Filed: Feb. 23, 1999

(51) Int. Cl.$^7$ ............................................... G06F 17/30
(52) U.S. Cl. .......................... 707/102; 707/3; 707/104
(58) Field of Search ................................. 707/102, 3, 5, 707/512, 104; 355/27; 434/317

(56) References Cited

U.S. PATENT DOCUMENTS

| | | | |
|---|---|---|---|
| 4,888,648 A | 12/1989 | Takeuchi et al. ............. 358/335 |
| 5,303,148 A | 4/1994 | Mattson et al. ......... 364/413.01 |
| 5,335,072 A | 8/1994 | Tanaka et al. ............... 348/232 |
| 5,404,435 A | 4/1995 | Rosebaum .................. 395/147 |
| 5,479,488 A | 12/1995 | Lennig et al. ................. 379/67 |
| 5,532,838 A | 7/1996 | Barbari ....................... 358/400 |
| 5,546,145 A | 8/1996 | Bernardi et al. .............. 354/76 |
| 5,550,965 A | * 8/1996 | Gabbe et al. ................. 707/512 |
| 5,588,096 A | 12/1996 | Sato et al. ................... 395/135 |
| 5,619,708 A | 4/1997 | Ho .............................. 395/767 |
| 5,649,060 A | 7/1997 | Ellozy et al. ............... 395/2.85 |
| 5,664,061 A | 9/1997 | Andreshak et al. .......... 704/275 |
| 5,878,292 A | * 3/1999 | Bell et al. .................... 396/312 |
| 5,893,101 A | * 4/1999 | Balogh et al. ............... 707/100 |
| 6,072,980 A | * 6/2000 | Manico et al. .............. 434/317 |
| 6,112,207 A | * 8/2000 | Nori et al. ................... 707/101 |
| 6,115,717 A | * 9/2000 | Mehrotra et al. ............ 707/102 |
| 6,147,742 A | * 11/2000 | Bell et al. ...................... 355/27 |
| 6,208,988 B1 | * 3/2001 | Schultz ............................ 707/5 |
| 6,212,527 B1 | * 4/2001 | Gustman ..................... 707/102 |

* cited by examiner

Primary Examiner—Jean R. Homere
(74) Attorney, Agent, or Firm—Mark G. Bocchetti (57) ABSTRACT

An image storage, indexing and retrieval system is disclosed in which a plurality of images are storable in digital form (on a writeable DVD), each with an associated information file, the associated information file including metadata which has been automatically captured and stored and/or input by a user. Metadata is automatically captured via the camera. The user can also input metadata via the camera at the time of image capture, or via a player/recorder system and its various interfaces when the captured images are added to an interactive database stored in random access memory. The user may designate one or more elements of the metadata of the associated information file as an image link for each of the image files, and further the user may specify more than one image links for each of the image files. All of the images having a common image link form a group of images, and the user can determine a sequence of display of all of the digital image files any group. An index is created of all of the image links associated with any of the image files and this index is communicated to the user. The user can, via a selected image link, retrieve the group of images having that associated image link with such group of images being retrieved in the sequence predetermined by the user. The sequence can be preset either at the time the user stores the group in the interactive database, or during subsequent editing of the group of images associated with the selected image link. The index can be communicated audibly or by visual display.

26 Claims, 13 Drawing Sheets

INTERACTIVE IMAGE STORAGE, INDEXING AND RETRIEVAL SYSTEM

FIELD OF THE INVENTION

The present invention relates generally to image capturing, storing, organizing, indexing and retrieving systems and, more particularly, to capturing, storing, organizing, indexing and retrieving images via picture icons and voice activated commands.

BACKGROUND OF THE INVENTION

At present personal pictures are typically stored as prints in albums or "shoe boxes". Video images are stored on video tape in linear tape formats without any sequence directory. Images, both in still and motion formats, can be stored on Floppy Disks, Photo CD's, Picture CD's, CD-ROM's, Video Tapes, DVD's or similar media. However, video tapes do not provide random access to images, sounds, or video sequences, all of which can be stored thereon and later retrieved from the video tape. Further, CD and DVD recorders do not provide a convenient means to index images, sounds, or video sequences recorded thereon, either as they are recorded or after they are recorded. CD's, DVD's and other Random Access Memory (RAM) devices may provide a sequential "chapter" designation for each start/stop sequence recorded, but these are chronological, numeric designations. There is no current means to index, store, sort, or retrieve images, sounds, or video sequences using orally recorded alpha-numeric designations, graphical icons, or index images during recording of the images, or after images have been recorded. These images can be retrieved and displayed via computer monitors or television sets. At present the retrieval process is necessarily sequential and the organization required to develop a soft or hard copy photo album can be very tedious and time consuming.

SUMMARY OF THE INVENTION

It is therefore an object of the present invention to provide an image capturing, storing, indexing, and retrieval system where indexing can be performed both during and after recording of the images.

It is a further object of the present invention is to provide an image capturing, storing, indexing, and retrieval system where audio can be stored and associated with designated images.

Yet another object of the present invention is to provide an image capturing, storing, indexing, and retrieval system where indexing and retrieval of still and/or motion images can be done using key words, picture icon (hereinafter referred to as "picons") and/or voice activated commands via a device such as a computer with a monitor or DVD recorder/player with television.

Another object of the present invention is to provide an image capturing, storing, indexing, and retrieval system which provides means for associating with each stored image an information file which includes automatically captured and stored metadata as well as user inputted data.

A further object of the present invention is to provide an image capturing, storing, indexing, and retrieval system which allows a user to designate at least one element of the information file associated with an image as an image link.

Still another object of the present invention is to provide an image capturing, storing, indexing, and retrieval system which allows a user to add and edit information files associated with stored images.

Another object of the present invention is to provide an image capturing, storing, indexing, and retrieval system which allows a user to add images to already existing image files, or to add new image files for storage of existing and/or new images therein.

Yet another object of the present invention is to provide an image capturing, storing, indexing, and retrieval system which allows a user to create various image files containing images in a sequence designated by the user.

Briefly stated, the foregoing and numerous features, objects and advantages of the present invention will become readily apparent upon reading of the detailed description, claims and drawings set forth herein. These features, objects and advantages are accomplished by an image storage, indexing and retrieval system in which a plurality of images are storable in digital form on a writeable CD (such as a writeable DVD), each with an associated information file, the associated information file including metadata which has been automatically captured and stored and/or input by a user. Metadata is automatically captured via the camera. The user can also input metadata via the camera at the time of image capture, or via a player/recorder system and its various interfaces when the captured images are added to an interactive database stored in random access memory. Various interfaces allow a user to designate at least one element of the metadata of the associated information file as an image link for each of the image files, and further allows the user to specify more than one of the image links for each of the image files. All of the images having a common image link form a group of images, and the user can determine a sequence of display of all of the digital image files of any group. The user can determine a sequence of display of all of the digital image files associated with a selected image link. An index is created of all of the image links associated with any of the image files and this index is communicated to the user. The user can, via a selected image link, retrieve the group of images having that associated image link with such group of images being retrieved in the sequence determined by the user. The sequence can be preset either at the time the user stores the group in the interactive database, or during subsequent editing of the group of images associated with the selected image link. Retrieval of a group of images can be for purposes of display on a monitor, electronic transmission, editing, copying, and/or printing of hard copies. The user may edit any group of images in the interactive database or add a new group of images to the interactive database at any time, including but not limited to the addition of image files thereto, the subtraction of image files therefrom, the creation and/or designation of new image links. The index can be communicated audibly or by visual display. Preferably, the user can input commands to the camera and/or the player/recorder system via voice actuation, or by tactile input means. A remote interface may also be provided to allow the user even greater flexibility to transmit commands either to the camera or to player/recorder system.

DETAILED DESCRIPTION OF THE INVENTION

Figure 1:
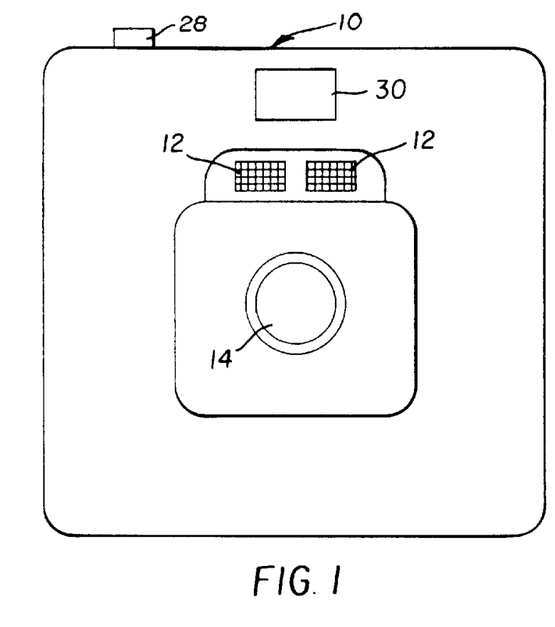
FIG. 1 is a front elevation of the DVD Picon/Imagette/Sound Indexing camera.
Figure 2:
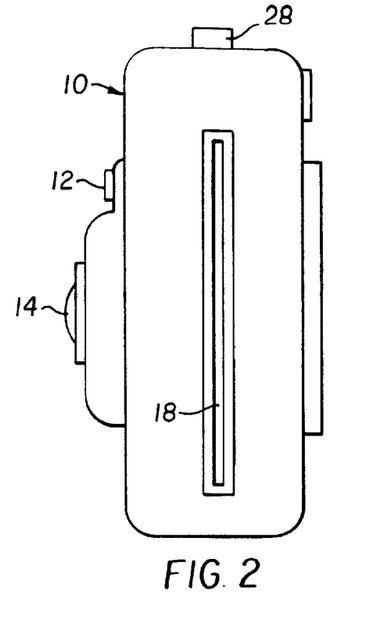
FIG. 2 is a side elevation of the DVD Picon/Imagette/Sound Indexing camera.
Figure 3:
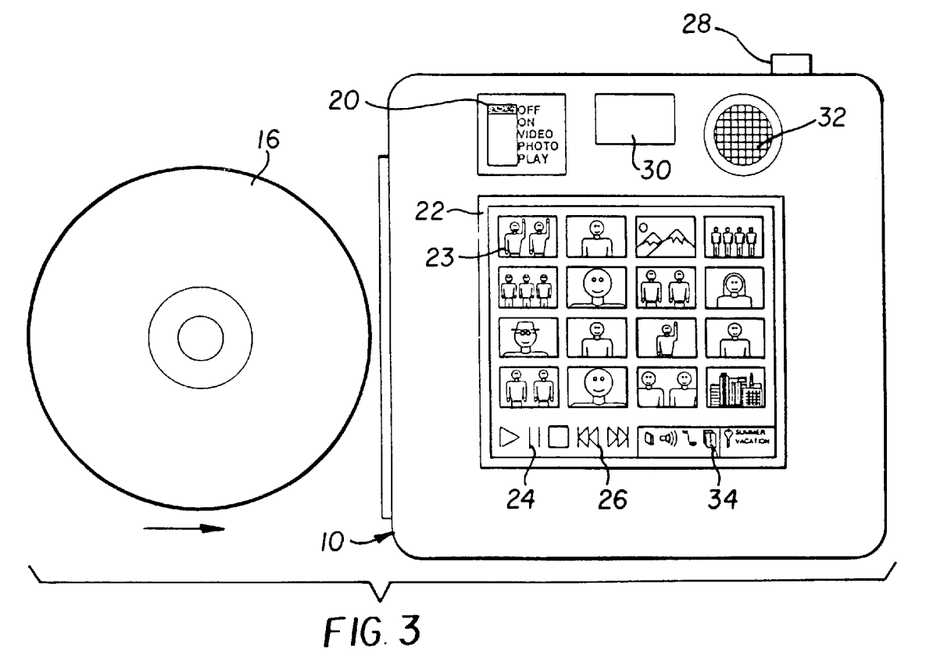
FIG. 3 is a rear elevation of the DVD Picon/Imagette/Sound Indexing camera in combination with a writeable DVD.

Turning first to FIGS. 1 through 3 there is shown an indexing camera 10 which includes both primary image storage on a disk 16 and secondary picture index storage such as on RAM (not shown). The DVD indexing camera 10 includes stereo microphones 12 which can be used to record sounds from the scene, or to record oral commands from the user. U.S. Pat. No. 5,546,146 to Bernardi et al., entitled Camera On-Board Voice Recognition, describes how a voice activated camera functions and is hereby incorporated herein by reference. Images are recorded through lens 14 and are stored on Digital Video Disk 16 which is inserted into the camera 10 through the DVD access slot 18. Primary image storage is captured on removable media. Various types of removable media are available such as, for example, magnetics on film (MOF), RAM, optical discs, digital tape, and the like. Preferably, the storage media used is a random accessible storage memory such as: magnetic or optical disks. However, today's linear digital tape storage can also be used. The secondary storage or picture index memory is best done with Flash RAM. The camera 10 is operated using a mode selector switch 20. In addition, the back side of the camera includes a touch screen 22 with the touch screen operation controls 24 and touch screen indexing controls 26. Camera 10 further includes a record/capture button 28. There is an optical viewfinder 30 which is used for framing the scene the user wishes to capture. Touch screen 22 may also be used as a viewer to frame a scene, either alone or in conjunction with optical viewfinder 30. The touch screen 22 may also be used to select a thumbnail image (Picon) to review the previously recorded still or motion images, as well as to control camera operation or indexing functions. There is a speaker 32 which can be used to hear previously recorded sounds, to verify verbal commands issued by the user, or to provide sound or verbal instructions to the user. The touch screen display 22 can be used to view Picons 23 or Icons 34. A user can index a video sequence, a still image (photo), or grouping of still images by the use of representative Picons 23, designated Icons 34, or verbal references. Picons 23 and oral indices can be established prior to or after images are recorded. Picons 23 may be the first image recorded in a video sequence or a lower resolution version of a recorded still image. Other pre-recorded Picons 23 or Icons 34 may be used in place of those (Picons or Icons) taken from the actual scene.

The camera 10 provides automatically recorded information (automatically recorded metadata) associated with each still image or recording sequence, and manually recorded information (manually recorded metadata) initiated, by the user. Images recorded by the user or pre-stored graphics may be used as Picons or icons, respectively, for storage and retrieval of information or for custom editing the presentation sequence of the recorded sequences or still images. Automatically recorded metadata may include things such as, for example, index pointers to images, time, date, GPS location (associated place), attitude, altitude, direction, exposure settings (aperture/shutter speed), illuminate (daylight/tungsten/florescent/IR/flash), lens setting (distance/zoom position/macro), sound volume/frequency, scene data (blue sky/water/grass/faces), and subject motion. The user also has the option of manually designating metadata to be added such as; scene length, event length, time frame (within the hour, today, this week), record mode (motion/still/burst), and user a designations (text, image, or verbal designation). The camera, if employed in a video mode, may include a scene change detection algorithm which automatically detects when the scene being shot changes, captures a still image associated with the beginning of the scene change and records this as a small version thumbnail or Picon to a portion of RAM designated for visual index information. The second(s) of associated sound bytes and metadata, and image file address pointers of the corresponding image sequence are also recorded. The camera 10 when used to capture an event may also allow through software, for the operator to indicate a particular point in the shooting where a still image for indexing purposes should be captured. It also will index still images when in the still image mode and can automatically sequence the remaining stills for story telling applications until the end of sequence is pushed or the camera shuts down. These operator designated index images (Picons 23) with associated sound bytes and metadata are also recorded to RAM and added to the visual scene index directory. The camera 10 employs a mode to interactively link new images or motion sequences by displaying the pre-stored camera master picture directory on the camera LCD. Upon selecting the desired master index thumbnail, the new images and thumbnails will be added to this picture directory sequence path thus evolving the hierarchical picture directory. The sound bytes and metadata are also linked. A new master or sub directory picture thumbnail image—Picon can be generated or an existing thumbnail can be substituted by another image at any time. The master index directory is saved to the camera flash memory. This can be on a fixed or removable RAM disk or card. These master directories can be interchanged to represent a new story telling theme. The master picture directory can be independent from the primary storage media, and it has the disc ID and address pointers for all the indexed sequences. Each image or sequence of motion video contain these pointers to the image directory. The primary picture storage media may also contain a copy of this master index as well.

The camera 10 described above is the preferred embodiment, but the same type of metadata could be captured using an Advanced Photo System camera or other format film camera and magnetics on film, any format film camera equipped with an electronic chip on the magazine or cassette, or an electronic camera memory. A photofinisher receiving film can arrange and write the images onto a DVD disk, Picture CD, or other type of memory such as a Iomega removable hard drive using the methods described in U.S. patent application Ser. No. 09/031,173, Photofinishing Method for Automated Advanced Services Including Image and Associated Audio Data Processing, U.S. Pat. No. 6,147,742, which is hereby incorporated herein by reference.

Figure 4:
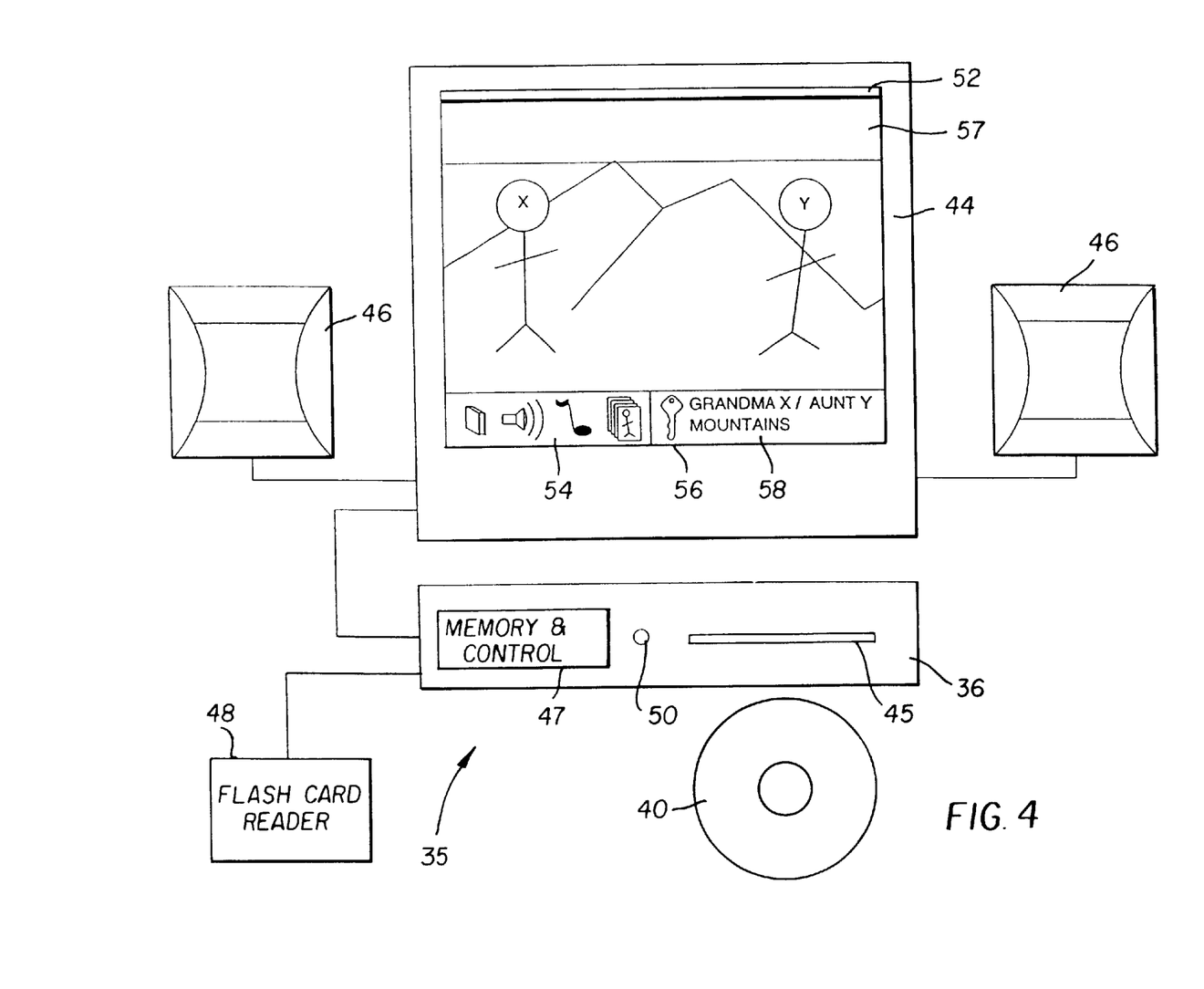
FIG. 4 is a schematic showing the DVD player with control and memory, the monitor, a DVD disk, and a set of speakers.

Turning next to FIG. 4 there is shown a system 35 incorporating a corresponding player/recorder 36 extendible to a multiple disc environment such as a jukebox (not shown), an interactive remote control 38 (see FIG. 5) and a controller with software (not shown) to execute the index and/or retrieval commands of a user. The process runs under CPU control with associated indexing and retrieval applications as employed in computer operating systems. System 35 is a DVD voice actuated image and audio albuming system for storing images on a device such as a DVD disk 40, filing the images so they are linked to key words or phrases, retrieving the image(s) and associated sound by voice command using a microphone 42 located on the remote control 38, and viewing the images on a monitor 44 such as a television and hearing the audio via the speakers 46 as the DVD disk 40 is played on the DVD player/recorder 36 with a control and memory (not shown). DVD disk 40 is insertable into system 35 via slot 45. System 35 may also have associated therewith a flash card reader 48. The interactive remote control 38 preferably interfaces with system 35 via IR transmission through IR transceiver 50. A menu bar 52 may also be displayed on monitor 44. Also displayed on monitor 44 are icons 54 key word symbol 56 with associated key words 58.

Figure 5:
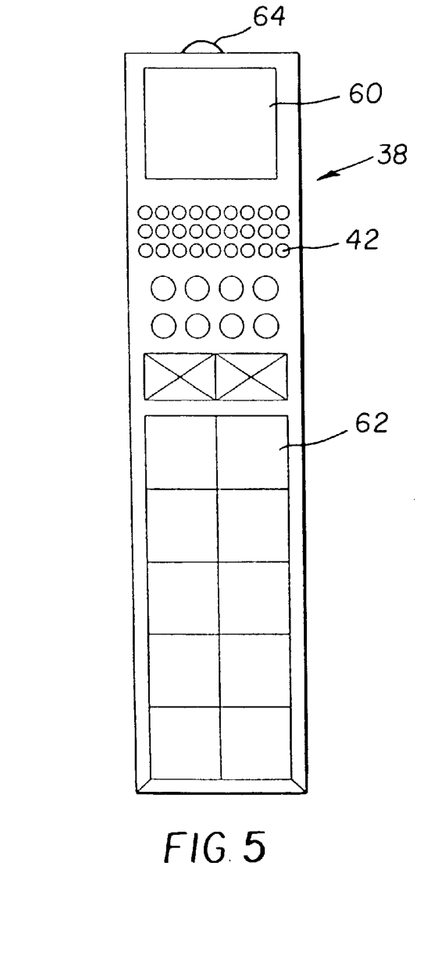
FIG. 5 is a schematic front elevation view of the remote.

Referring to FIG. 5, the DVD remote control 38 with microphone 42 also has a display 60. An example of a voice activated remote is a MAGNAVOX Smarttalk VP 8000 VCR Voice Programmer. The remote control 38 is used during and after recording and during viewing, to retrieve images, to selectively edit, arrange sequences and through use of microphone 42, for audio recording, sound annotation, or verbal operational instructions. For those skilled in the art, an example of voice activation software is IBM's "Via Voice". The remote control 38 is equipped with manual control buttons 62 that work interactively with the DVD recorder/player system 35 and storage media 40. The display 60 can be a LCD touch screen display that allows the operator to carry out any of the functions listed above. Remote control 38 also includes an IR transceiver 64 for communicating with system 35.

Figure 6:
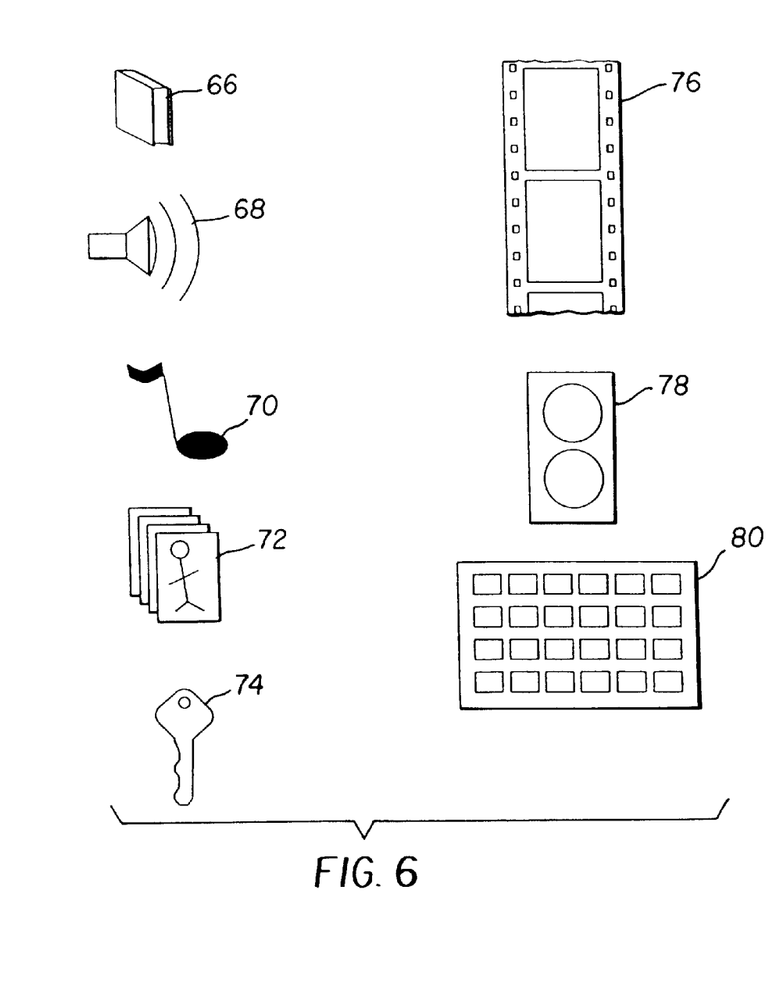
FIG. 6 depicts exemplary symbols (icons).

Now referring to FIG. 6, the icons 54 (as referenced previously in FIG. 4) indicate what types of files are associated with the image(s) shown on the monitor 44. The meanings of the icons 54 are, for example, a story 66, audio 68, music 70, additional images 72, keywords 74 which indicates that there are keywords associated with the image, motion 76, video snippet 78, and pages of master index images Picons 80 associated with the picture shown on the monitor 44. Additional icons 54 representing other features can be created in the same manner icons are created using a computer. Icons 54 can also be created from Picons 80 selected to represent picture sequences such as from a vacation, birthday, special event, or anything the user would like them to represent.

Figure 7:
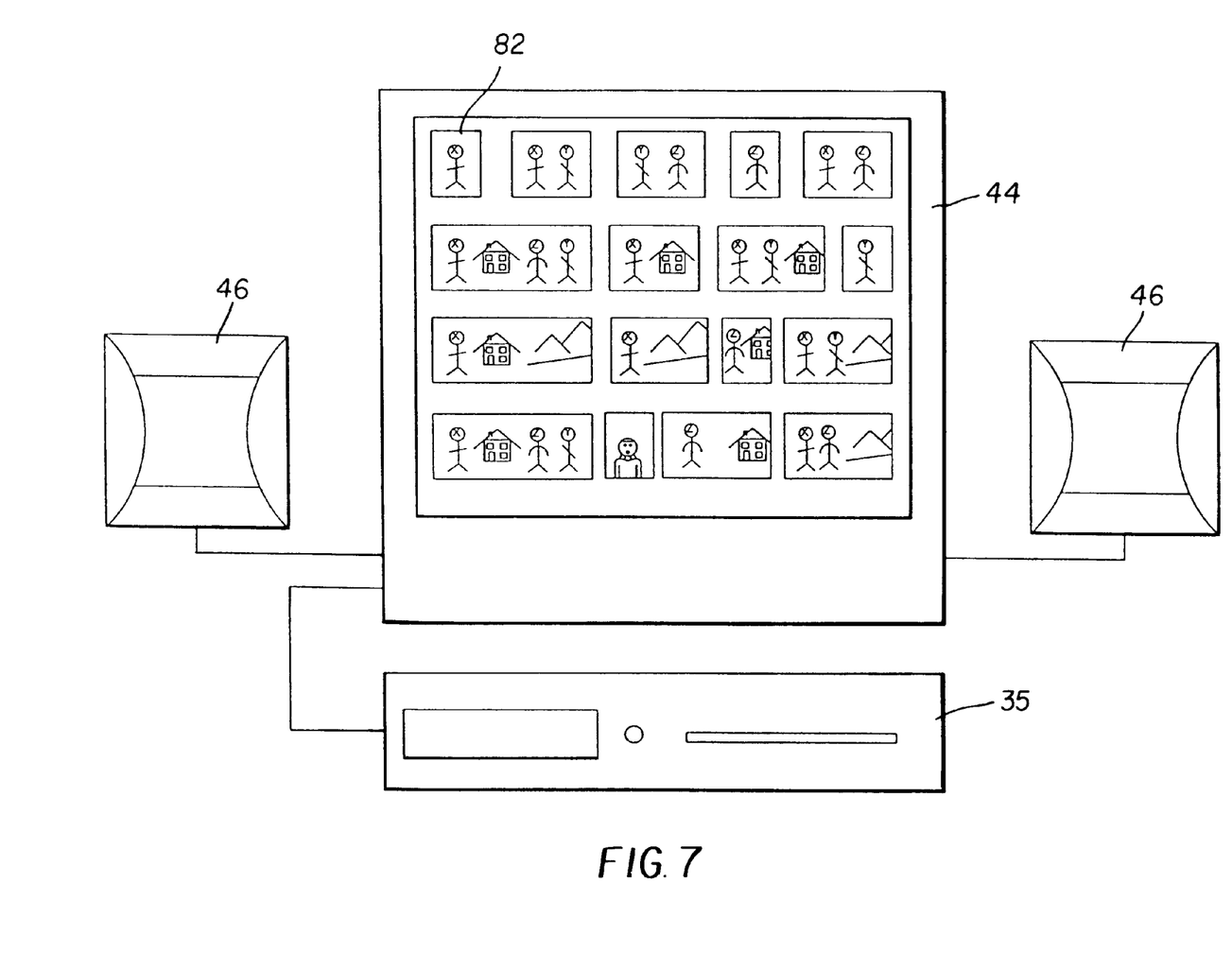
FIG. 7 is a schematic showing the interactive albuming system where by uttering a key word, all the images associated with the key word are shown as "thumb nail" images in index format on the monitor.

Now referring to FIG. 7 there is depicted a schematic showing DVD-voice actuated image and audio albuming system 35 where by saying, for example, the word "grandma", all the images 82 associated with a "grandma" (which can include a Grandma X, a Grandma Y and a Grandma Z, for example, as are depicted) are shown as "thumb nails" images in index format on the monitor 44.

Figure 8:
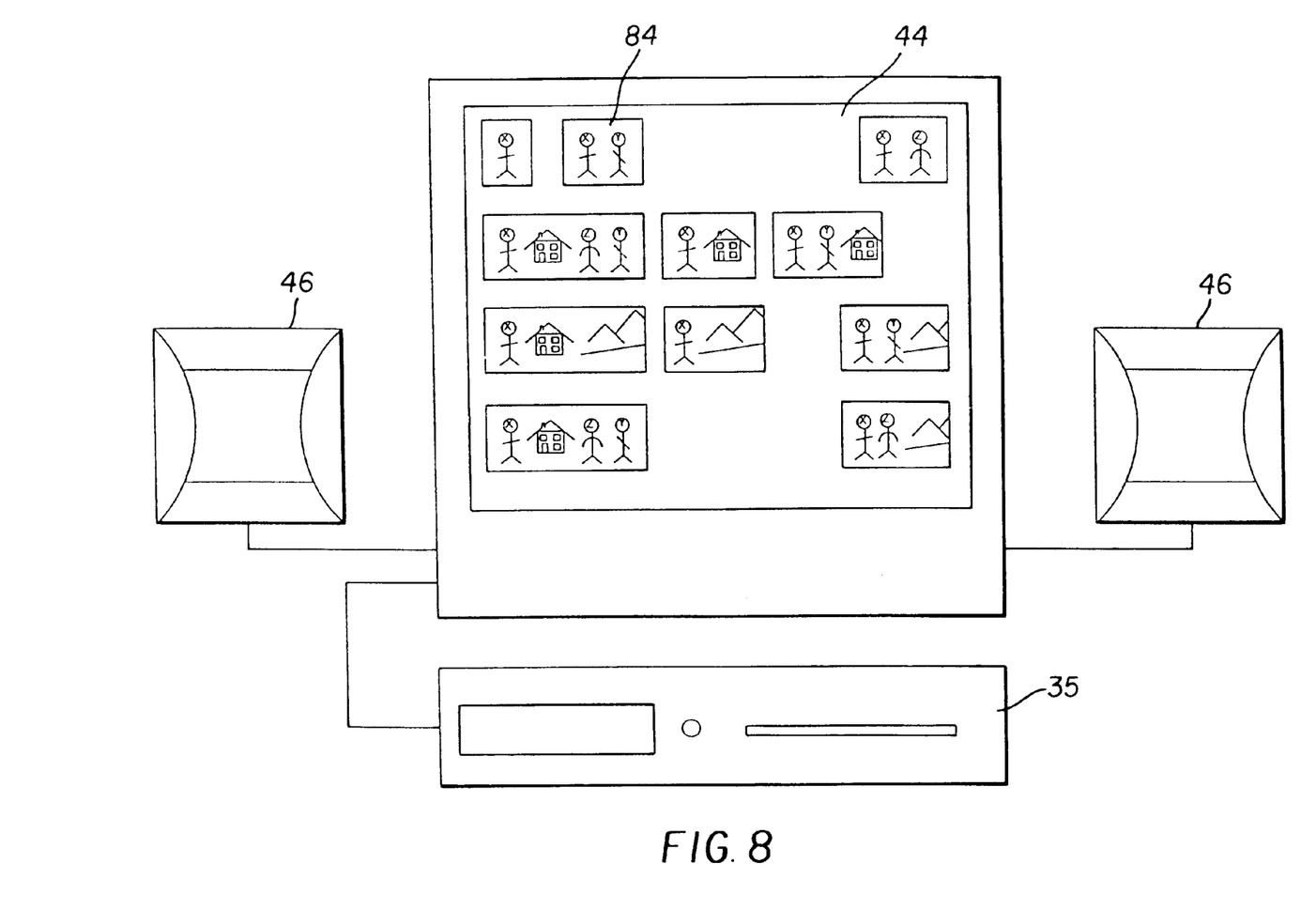
FIG. 8 is a schematic showing the interactive albuming system of FIG. 7 wherein further sorting of the thumb nail images is accomplished by uttering additional key word(s).

Turning to FIG. 8, the thumb nail images 23 can then be further sorted by using additional words spoken orally such as, for example, "Grandma X." Then, in response to those spoken words, only those pictures 84 of Grandma X (if they have been indexed with that word) would appear on the monitor 44.

Figure 9:
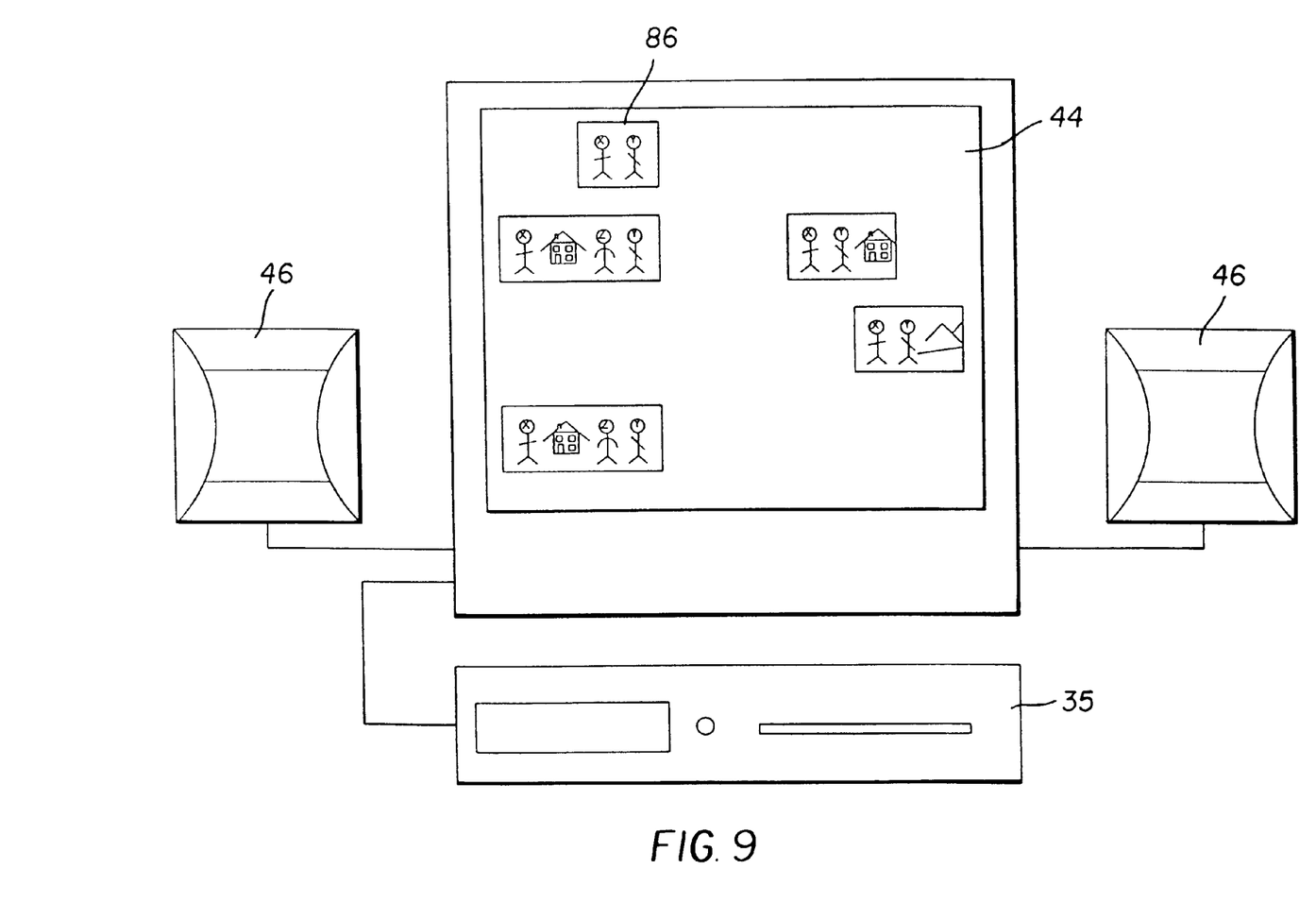
FIG. 9 is a schematic showing the interactive albuming system of FIG. 8 wherein still further sorting of the thumb nail images is accomplished by uttering additional key word(s).

Looking at FIG. 9, the thumb nail images 23 can then be further sorted by using additional words (again spoken orally) such as Grandma X and Aunt Y. All images 86 showing Grandma X and/or Aunt Y would then appear on monitor 44.

Figure 10:
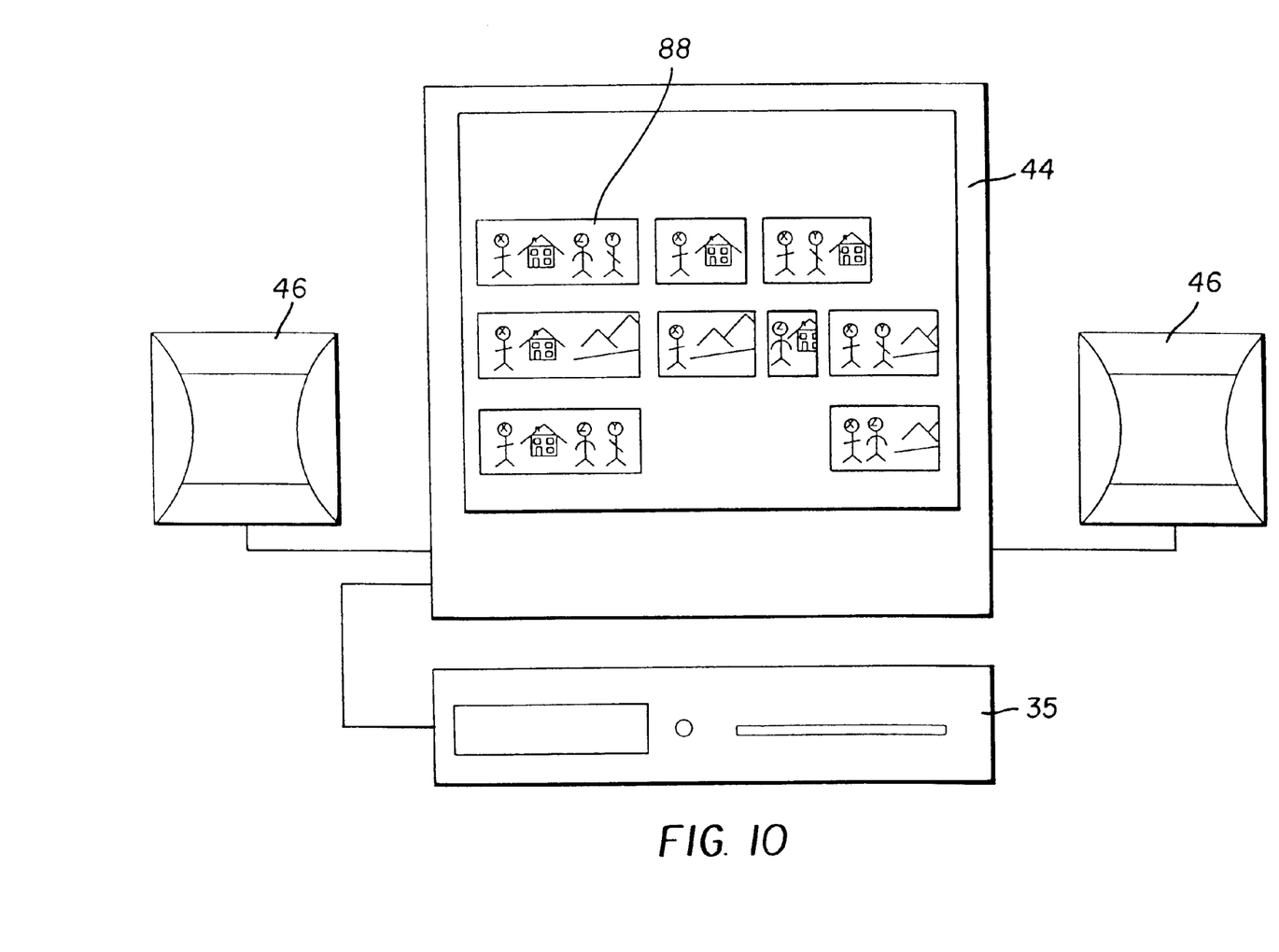
FIG. 10 is a schematic showing the interactive albuming system of FIG. 9 wherein still further sorting of the thumb nail images is accomplished by uttering additional key word(s).

The images can be sorted further by adding more key words such as "Grandma X at her cabin the Ozark Mountains". All images 88 showing Grandma X at her cabin in the Ozark Mountains would then appear on monitor 44 as shown in FIG. 10 (assuming the images had been indexed with such key words).

Figure 11:
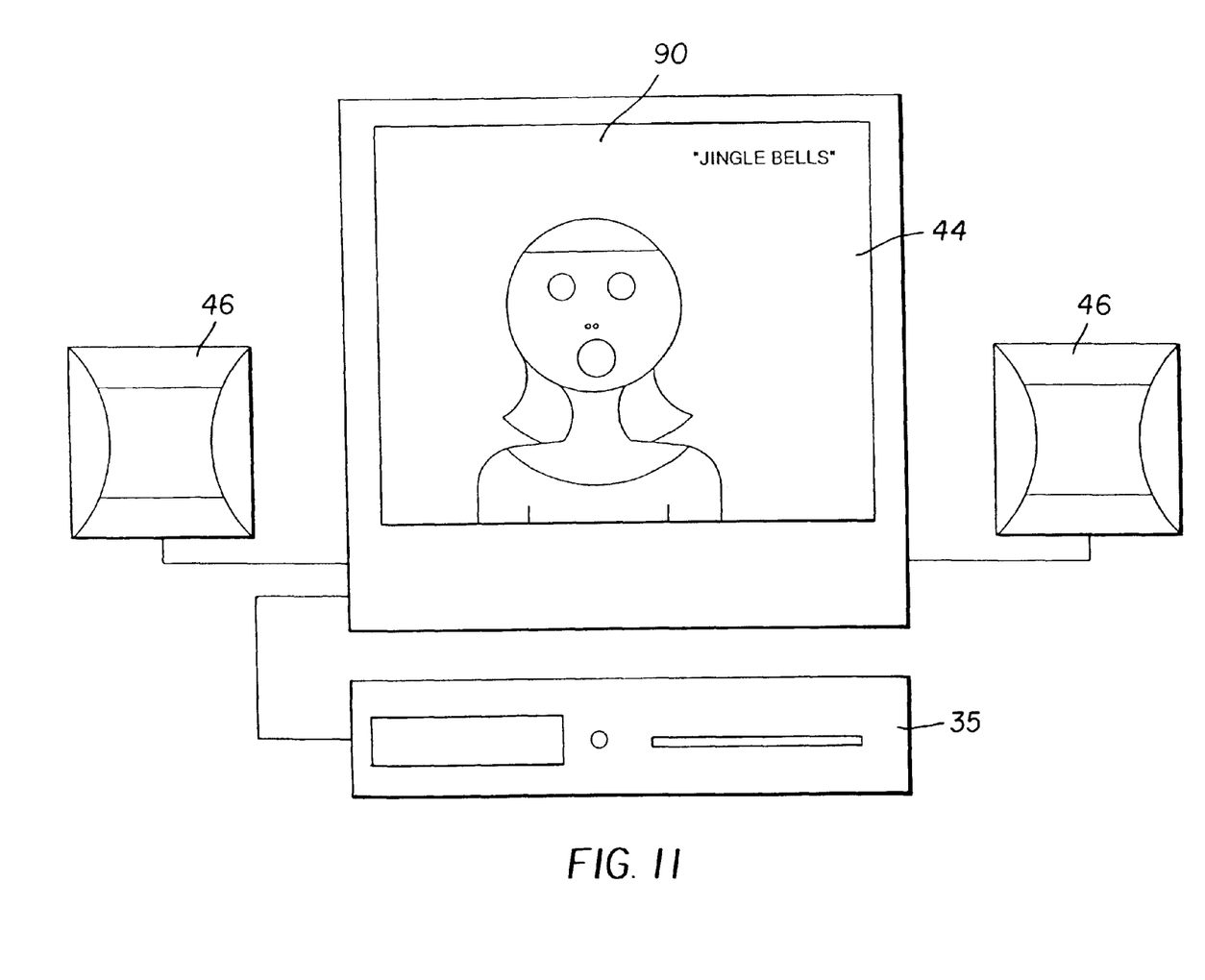
FIG. 11 is a schematic showing the interactive albuming system of FIG. 9 wherein individual images can be viewed by uttering key word(s) which would also play any audio file associated with that image file.

As shown in FIG. 11, by saying the word "singing" for example, all the images associated with a grandma singing and the associated audio files will be shown as image(s) 90 on monitor 44. By selecting a specific image, the associated audio file would be played. These can then be further sorted be using additional words such as, for example, Grandma X singing Christmas carols. Then only pictures of Grandma X in which she was singing a Christmas carol would appear.

Figure 12:
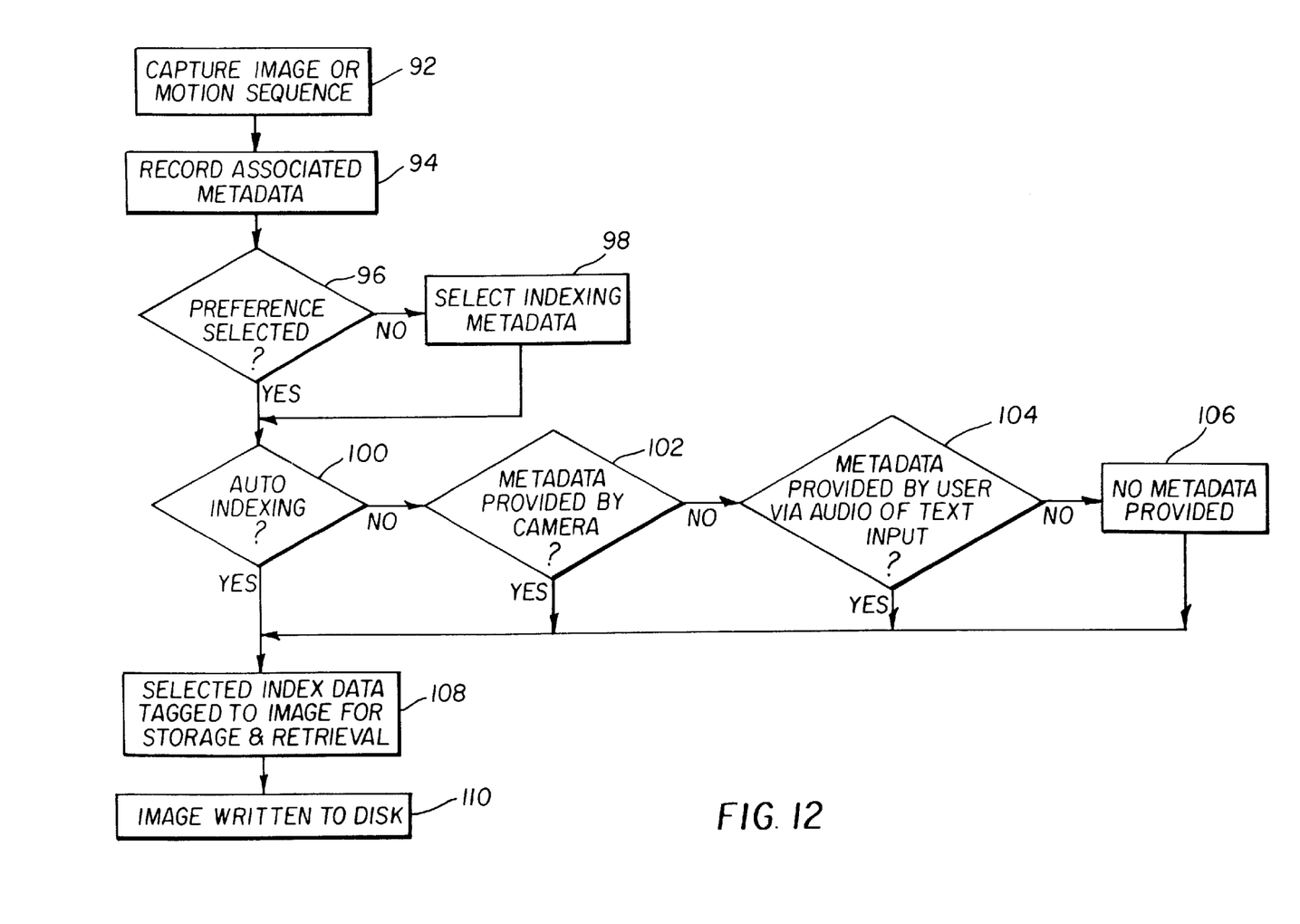
FIG. 12 is a flow chart showing the logic of how the master directories and image files are created in the DVD Picon/Imagette/Sound Indexing camera.

Referring to FIG. 12, a flow chart is presented showing how the master directories and image files are created in the DVD Picon/Imagette/Sound Indexing camera 10. The user captures an image (still) or images (motion sequence) as indicated in function block 92 and records the associated metadata as indicated in function block 94. If the camera 10 does not have the preference selected (decision block 96), the user can choose to select what metadata he or she prefers, for example, time and date as indicated by function block 98. If the preference has been set,that is, the answer to decision block 96 was "yes", the user chooses whether or not to have the camera automatically tag and index (decision block 100). If the answer is "no" the user can choose to tag and file the captured image using metadata from the camera (decision block 102). If the answer to decision block 102 is "no" the user can choose to input the metadata manually (decision block 104). If the answer to decision block 104 is "no" the user can choose not to provide metadata (as indicated by function block 106). If the answer to decision block 100 is "yes" the images captured are automatically tagged by the camera 10 using the associated metadata to create an index (as indicated by function block 108) and are filed in camera memory, for example DVD disk 16 of FIG. 3 (as indicated by function block 110). If the answer to decision blocks 102 or 104 are "yes" the images captured are automatically tagged with the selected metadata and are filed in camera memory (as indicated by function block 110). The sequential images will be tagged with the metadata until the camera power is turned off.

Figure 13:
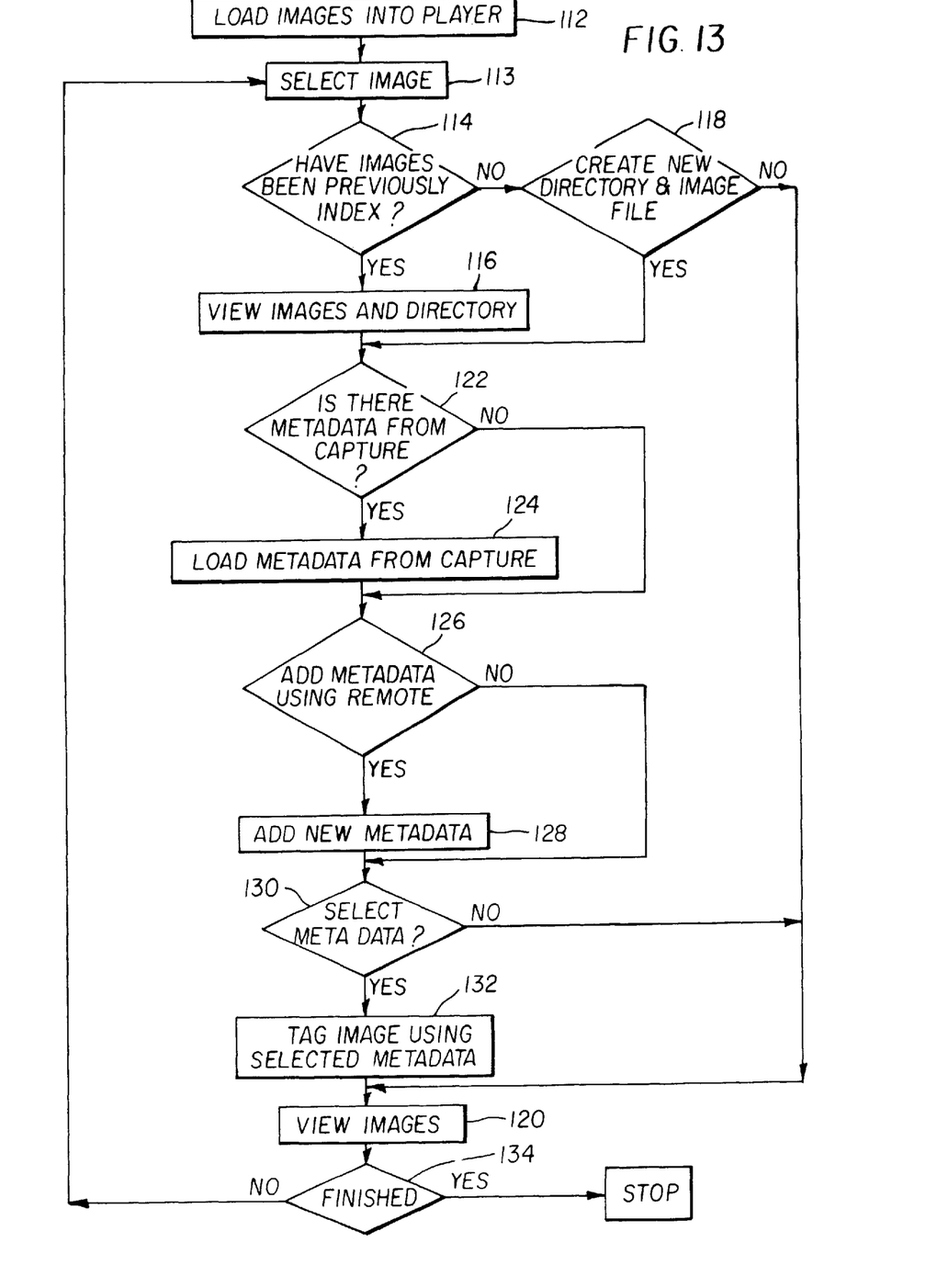
FIG. 13 a logic diagram of how the images index and files are created using the DVD voice actuated image and audio albuming system.

Now referring to FIG. 13, there is graphically presented a logic diagram of how the images' index and files are created using DVD voice actuated image and audio albuming system 35. A disk 40 containing digital image files is loaded into the player/recorder 36 per function block 112. The user selects an image (for example, image 57 shown in FIG. 4) per function block 113. The memory and control unit 47 of the player/recorder determines if the selected image has been previously filed and indexed per decision block 114. If the answer to decision block 114 is "yes", that is, the image has been filed and indexed, the image will appear on the monitor 44 in index format as indicated by function block 116. If the image has not been previously filed and indexed (the answer is "no"), the first image on the disk will appear on the monitor and the user can decide if he wants to create a file and an index per decision block 118. If the answer is "no", the user simply views the image 57 on the monitor 44 as indicated by function block 120 and advances to the next image. If the answer is "yes", the memory and control unit 47 determines if there is metadata from the camera 10 per decision block 122. If the answer to decision block 122 is "yes", the metadata from the camera 10 is loaded into the memory and control device 47 as indicated by function block 124. The metadata may be loaded via a device such as a flash card reader 48, DVD disk 40, or from metadata that has previously been transferred into the memory and control unit 47. If the answer to decision block 122 is "no", the user is asked if he would like to enter additional metadata using the interactive remote control 38 per decision block 126. If the answer is "yes", the user inputs new metadata using the interactive remote control 38 per function block 128, i.e. attaches a keyword such as "grandma" to the displayed image 57. If the answer is "no", the user then is asked to select metadata (per decision block 130) from capture i.e. date and time recorded by the camera. If the answer to decision block 130 is "no", the user views the image. If the answer is "yes", the user selects the specific metadata and the metadata is linked or tagged to the displayed image 57 per function block 132. The process is then repeated for additional images until the user has finished per decision block 134 filing and indexing the images.

Figure 14:
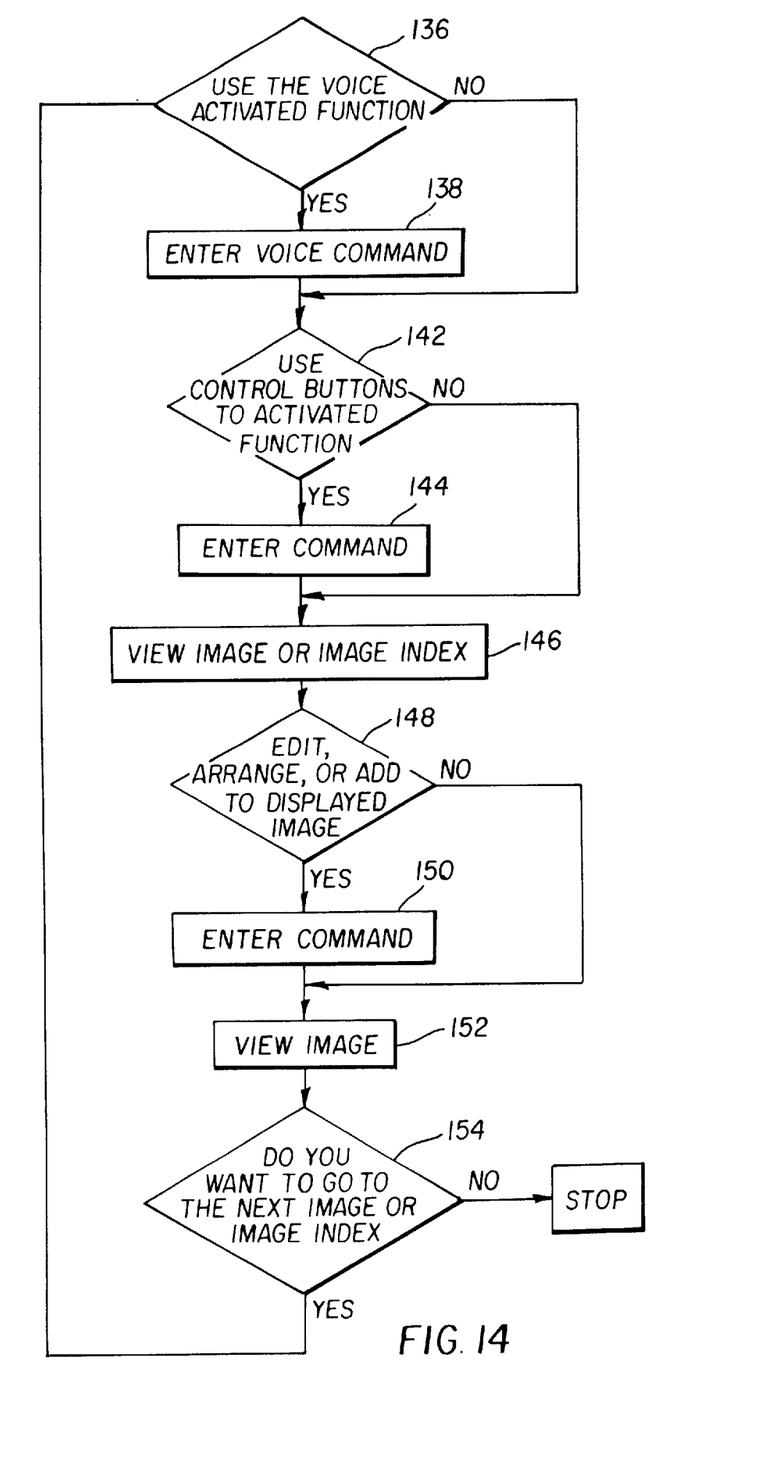
FIG. 14 depicts a logic diagram for the operation of the interactive remote control.

Now referring to FIG. 14 there is depicted a logic diagram of the operation of the interactive remote control 38. A user can decide to control the DVD-voice actuated image and audio albuming system 35 using the remote 38 per decision block 136. If the user decides to use voice activation, a command can be orally entered per function block 138. If the user decides not to use voice activation, the user can use the control buttons 62 or the display 60 which can be an LCD touch screen to retrieve an image 57 or an image index 140 (see FIG. 15) per decision block 142 to enter the appropriate commands as shown by function block 144. In this manner, the user selects an image 57 or an image index 140 to view as indicated by function block 146. The user can now choose to edit, arrange, or add metadata to the displayed image 57 or image index 140 per decision block 148 by entering the appropriate command per function block 150. Alternatively, the user can just view the image per function block 152. The user can then choose to go to the next image index 140 or image 57 or can choose to stop per decision block 154.

Figure 15:
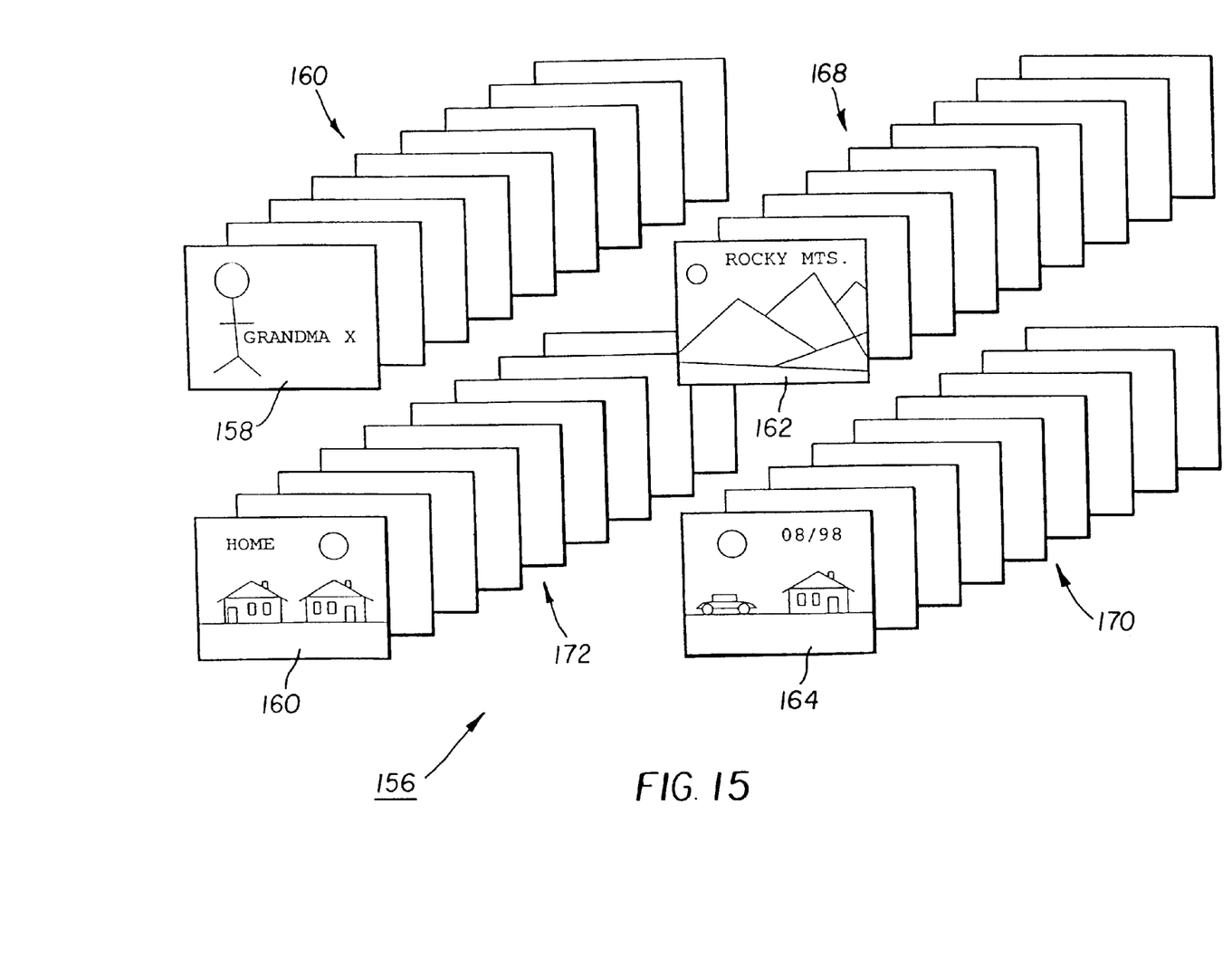
FIG. 15 is a schematic representation of the file structure of the master index directory and file of the DVD voice actuated image and audio albuming system.

Now referring to FIG. 15, there is shown a schematic of the file structure of the master index directory and file 156 of the DVD voice actuated image and audio albuming system 35. When the user selects an image 158 to be used to represent a group of images 160, the selected image 158 becomes a Picon which represents the linked group of images 160. Linking is accomplished using selected metadata. In the case of images 160 containing Grandma X, the metadata used is a subject in the image, namely Grandma X. The image 158 selected then becomes the Picon 158 for the group of images 160 containing Grandma X. Similarly, other images can be selected to become Picons 162, 164, 166, for other groups of images 168, 170, 172 again using any selected metadata. For example, image 162 of the Rocky Mountains can be chosen to be the Picon 162 for a family's summer vacation to the Western U.S. in 1997 where the group of images 168 are linked via the selected metadata under the subject of the family's 1997 summer vacation. The selected metadata is an event where all the images have been captured while the family was on vacation. All the images of the family's 1997 summer vacation 168 are tagged and filed together using the Rocky Mountain Image 162 as the Picon. As an example of using a date as the selected metadata images 170 are all images taken on a specific date which have been tagged using the selected metadata such as the date August 1998. The image 164 of the car and house can be chosen as the Picon 164 and all images tagged and filed using that date as the selected metadata are linked as the group of images 170. As yet another example, the selected metadata can be a specific location. An image 166 such as a group of houses can be selected as the Picon 166 for a group of images 172 taken at that location where the selected linking metadata is a specific location.

Figure 16:
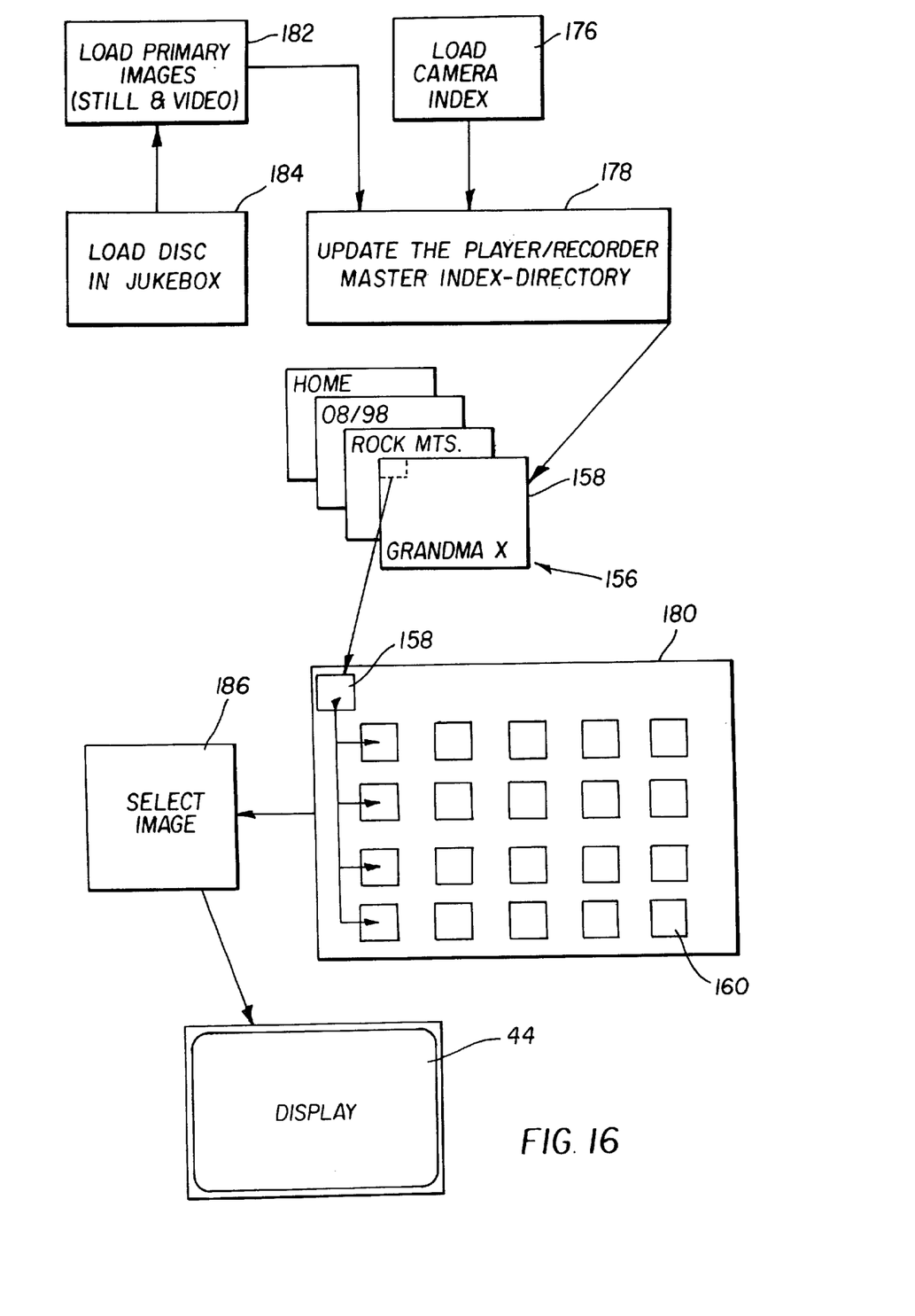
FIG. 16 is a schematic representation of the master index—directory stored in the memory and control unit of the DVD voice actuated image and audio albuming system and how the master—index directory is updated and displayed.

Now referring to FIG. 16 there is schematically represented a master index—directory 156 stored in the memory and control unit 47 of the DVD voice actuated image and audio albuming system 35. A master index directory 156 is created using the steps described in FIG. 15. A master index directory 156 can also be created in a capture device such as the DVD Picon/Imagette/Sound Indexing camera 10 described in FIGS. 1, 2 and 3. If created in a camera 10, the master index directory 156 is down loaded into the memory and control unit 47 per function block 176. The downloaded master index directory 156 where the existing master index directory is updated per function block 178. The master index directory 156 is displayed as array of image Picons 180 with each Picon being linked to a stored group of images, for example, groups of images 160, 166, 168, 170. Additional images can be loaded into of the DVD voice actuated image and audio albuming system 35 via a Digital Video Disk 40 per function block 182 or a DVD Jukebox per function block 184. When an image(s) 57 that has not been entered in to the master index directory 156 are loaded, the image(s) appear in index format on the monitor 44. The user then follows the steps described in FIG. 13 to file and index the selected image(s) 57. The master directory 156 consists of Picons which represent a plurality of images grouped together under a common theme i.e. Grandma X, as described with reference to FIG. 15. The user can then select each image using the remote control 38 as shown by function block 186. The chosen image 57 is displayed on the monitor 44. Picons are created by selecting a specific image to represent a group of images as described with reference to FIG. 15, i.e. a specific image 158 of Grandma X can be used to create a Picon 158 that will appear as a representation in the master directory for all the images filed under the selected metadata, Grandma X. When the Picon 158 is addressed, the group of images 160 filed under that Picon 158 appear on the monitor 44 with the Picon 158 appearing in the corner. If the master index directory 156 is called up, the screen will show all the Picons of all of the groups of filed images.

It should be understood that provision is made in the player/recorder system 36, and/or in the camera 10 to edit the selection of index images 23, 34. In this mode, index images 23, 34 could be deleted from the index file and additional ones added as the index file and disc contents can be reviewed. This procedure gives the user the ability to do a custom rearrangement of a sequence of images for story telling. The DVD player/recorder 36 can also be used to alter the playback sequence or hide motion sequences or stills as noted in player memory and update the master picture directory.

From the foregoing, it will be seen that this invention is one well adapted to attain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

The invention has been described in detail with particular reference to certain preferred embodiments thereof, but it will be understood that variations and modifications can be effected within the spirit and scope of the invention.

PARTS LIST

| | |
|---|---|
| 10 | camera |
| 12 | microphones |
| 14 | lens |
| 16 | Digital Video Disk (DVD) |
| 18 | access slot |
| 20 | mode selector switch |
| 22 | touch screen |
| 23 | thumb nail images (picons) |
| 24 | touch screen operation controls |
| 26 | touch screen indexing controls |
| 28 | record/capture button |
| 30 | view finder |
| 32 | speaker |
| 34 | icons |
| 35 | DVD voice actuated image & audio albuming system |
| 36 | player recorder |
| 38 | interactive remote control |
| 40 | random access storage device |
| 42 | microphone |
| 44 | monitor |
| 45 | access slot |
| 46 | speakers |
| 47 | memory & control |
| 48 | flash card reader |
| 50 | IR transceiver |
| 52 | menu bar |
| 54 | icons |
| 56 | keyword symbol |
| 57 | first image |
| 58 | associated keywords |
| 60 | display |
| 62 | manual control buttons |
| 64 | IR transceiver |
| 66 | story |
| 68 | audio |
| 70 | music |
| 72 | additional images |
| 74 | key words |
| 76 | motion |
| 78 | video snippet |

PARTS LIST-continued

| | |
|---|---|
| 80 | picons |
| 83 | grandma images |
| 84 | pictures of grandma X |
| 86,88,90 | images |
| 92,94 | function block |
| 96,100,102,104,114,118,122 | decision block |
| 126,130,134,136,142,148,154 | decision block |
| 98,106,108,110,112,113,116 | function block |
| 120,124,128,132,138,144 | function block |
| 146,150,152,176,178,182,184,186 | function block |
| 140 | image index |
| 156 | structure & file |
| 158 | image/picon |
| 162,164,166 | image/picon |
| 160,168,170,172,174 | groups of images |
| 180 | array of image picons |

What is claimed is:

1. An image storage, indexing and retrieval system comprising:
   (a) at least one image storable in digital form as an image file;
   (b) an information file associated with each of said at least one image file, said information file including metadata related to a subject of said at least one image file which has been input by a user;
   (c) interface means for allowing a user to designate at least one element of the metadata of the associated information file as an image link for each of said at least one image file;
   (d) an interactive database for storing said at least one image and said information file associated therewith therein; and
   (e) an index communicating all of said image links to the user, said image links allowing the user to retrieve any of said at least one image files having a selected image link.

2. An image storage, indexing and retrieval system as recited in claim 1, further comprising:
   a camera for capturing said at least one image in digital form.

3. An image storage, indexing and retrieval system comprising:
   (a) a plurality of images storable in digital form, each as an image file;
   (b) an information file associated with each of said image files, said information file including metadata which has been automatically captured and stored and/or input by a user;
   (c) interface means for allowing a user to designate at least one element of the metadata of the associated information file as an image link for each of said image files, and further allowing a user to specify more than one of said image links for each of said image files said interface means further allowing the user to determine an automatic sequence of display of said image files for each of said image links;
   (d) an interactive database for storing said image files and said information files associated therewith therein; and
   (e) an index communicating all of said image links to the user, said image links allowing the user to retrieve any of said image files having a selected image link.

4. An image storage, indexing and retrieval system as recited in claim 3, further comprising:

a camera for capturing said plurality of images in digital form.

5. A method for image storage, indexing and retrieval comprising the steps of:
   (a) storing a plurality of images, each as a digital image file;
   (b) associating an information file with each of the digital image files, each information file including automatically captured and stored metadata and/or metadata input by a user,
   (c) allowing the user to designate at least one element of the associated information file as an image link for each of the digital image files wherein more than one image link can be designated for each of the digital image files;
   (d) allowing the user to determine an automatic sequence of display of the digital images associated with a user selected image link;
   (e) communicating an index of all of the image links to the user; and
   (f) allowing the user to retrieve all of the digital image files associated with the user selected image link.

6. A method as recited in claim 5 further comprising the step of:
   creating a database comprised of the digital image files and the information files associated therewith.

7. A method as recited in claim 6 further comprising the step of:
   allowing the user to edit any of the information files.

8. A method as recited in claim 4 further comprising the step of:
   retrieving all of the digital image files associated with the selected image link.

9. A method as recited in claim 8 further comprising the step of:
   displaying all of the digital image files associated with the selected image link.

10. A method as recited in claim 8 further comprising the step of:
    electronically transmitting all of the digital image files associated with the selected image link.

11. A method as recited in claim 8 further comprising the step of:
    printing all of the digital image files associated with the selected image link.

12. A method as recited in claim 4 further comprising the step of:
    allowing the user to add additional digital image files and the information files associated therewith to the database.

13. A method as recited in claim 12 further comprising the step of:
    allowing the user to designate at least one element of the associated information file as an image link for each of the additional digital image files wherein more than one image link can be designated for each of the additional digital image files.

14. A method as recited in claim 4 further comprising the step of:
    adding additional digital image files and the information files associated therewith to the database.

15. A method as recited in claim 14 further comprising the step of:
    designating at least one element of the associated information file as an image link for each of the additional digital image files wherein more than one image link can be designated for each of the additional digital image files.

16. A method as recited in claim 8 where in:
    said retrieving step is performed using tactile actuation.

17. A method as recited in claim 8 wherein:
    said retrieving step is performed using voice actuation.

18. A method as recited in claim 8 wherein:
    said retrieving step is performed by remote actuation.

19. A method as recited in claim 4 wherein:
    said communicating step is performed by displaying the index visually.

20. A method as recited in claim 4 wherein:
    said communicating step is performed by communicating the index orally.

21. A method for image storage, indexing and retrieval as recited in claim 5, further comprising the step of:
    capturing said plurality of images in digital form.

22. A method as recited in claim 5, further comprising the step of:
    allowing the user to create at least one image link for each of the digital image files using metadata input by the user.

23. A method for image storage, indexing and retrieval comprising the steps of:
    (a) storing a plurality of images, each as a digital image file in random accessible memory;
    (b) associating an information file with each of the digital image files, each information file including automatically captured and stored metadata and/or metadata input by a user,
    (c) allowing the user to designate at least one element of the associated information file as an image link for each of the digital image files wherein more than one image link can be designated for each of the digital image files;
    (d) allowing the user to determine an automatic sequence of display of the digital images associated with a user selected image link;
    (e) creating a master index directory of all of the image links and storing the master index directory in random access memory;
    (f) communicating the master index directory of all of the image links to the user; and
    (g) allowing the user to retrieve all of the digital image files associated with the user selected image link from the random accessible memory.

24. A method as recited in claim 23 further comprising the step of:
    capturing a plurality of images.

25. A method as recited in claim 24 wherein:
    the plurality of images are captured digitally.

26. A method of image storage, indexing and retrieval as recited in claim 23, further comprising the step of:
    capturing said plurality of images in digital form.

* * * * *